United States Patent Office 3,371,092
Patented Feb. 27, 1968

---

3,371,092
4-AMINO-N-POLYALKYLPHENYL-1,8-NAPHTHALIC IMIDES
Chi K. Dien, Buffalo, N.Y., assignor to Allied Chemical Corporation, New York, N.Y., a corporation of New York
No Drawing. Filed July 22, 1965, Ser. No. 474,152
5 Claims. (Cl. 260—281)

This invention relates to novel colorants which are characterized by improved fastness to light and migration as well as brighter and more intense color shades.

Specifically, this invention relates to novel colorants of the 4-amino-N-aryl-1,8-naphthalic imide series which exhibit improved fastness to light and migration as well as brighter and more intense green shades than do the previously known colorants of the 4-amino-N-aryl-1,8-naphthalic imide series.

It is an object of this invention to provide new and improved dyes of the 4-amino-N-aryl-1,8-naphthalic imide series.

A further object of this invention is to provide novel dyestuffs of the 4-amino-N-aryl - 1,8-naphthalic imide series as colorants for coloring organic products.

The present invention provides new colorants of the 4-amino-N-aryl-1,8-naphthalic imide series of the general formula

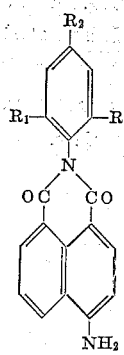

in which $R_1$, $R_2$, $R_3$ may be alike or different and represent lower alkyl radicals of up to four carbon atoms for each R group.

I have found the new colorants of the present invention to be valuable compounds, which after being brought into a finely dispersed form, may be used for colouring organic products, such as, for example, varnishes and plastic masses, and for the manufacture of printing colors, and for the spin-dyeing of synthetic fibers, for example of viscose rayon, cellulose actate rayon, nylon or polyester fiber. The 4-amino-N-2,4,6-trialkylaryl-1,8-naphthalic imides of the present invention yield dyeings which possess, in addition to excellent fastness to light, brighter and greener shades than dyeings obtainable with other previously employed 4-amino-N-aryl-1,8-naphthalic imides, for example such as are described in U.S. Patent No. 1,836,529.

The colorants of the present invention can be prepared by condensation of 4-amino-1,8-naphthalic anhydride with a 2,4,6-trialkylaniline having alkyl substituents of up to four carbon atoms for each alkyl radical. Alternately, the colorants of the present invention can be prepared by condensation of 4-nitro-1,8-naphthalic anhydride with a 2,4,6-trialkylaniline of the type described above, to yield a 4-nitro-N-trialkylaryl-1,8-naphthalic imide intermediate which is then reduced, for example through the action of a metal and a mineral acid, to a colorant of the present invention.

As examples of 2,4,6-trialkylanilines useful in the preparation of the products of the present invention, there may be mentioned, for example, mesidine, 2,4,6-triethylaniline, 2-ethyl-4,6-dimethylaniline, 2,4 - diethyl-6-methylaniline, 2,4,6 - triisopropylaniline, 2,4,6-tri(tertiary butyl)aniline and the like. 4 - nitro-1,8-naphthalic anhydride is well known in the prior art and may be prepared readily by oxidizing nitroacenaphthene, for example as reported in Chemische Berichte, volume 21, page 1460.

The following examples will further illustrate the products of the present invention, the parts and percentages being by weight unless otherwise indicated.

Example 1

A mixture of 550 parts mesidine and 380 parts 4-amino-1,8-naphthalic anhydride is heated at about 200 to 210° C. for about 3 to 4 hrs. while the water of condensation is being distilled off. The reaction mixture is then diluted with 600 parts mesidine and 700 parts ortho-dichlorobenzene while the temperature is allowed to drop to about 160° C. The product which precipitates is filtered, washed with about 500 parts ortho-dichlorobenzene and dried. There is obtained about 550 parts 4-amino-N-mesityl-1,8-naphthalic imide, M.P. about 340–343° C.

For further purification the product is slurried at about 80–90° C. in 5 percent by volume aqueous sulfuric acid for about one hour, filtered, washed free of acid and dried. The dried pigment is rendered into a finely divided form for use in coloring plastic masses, cellulosic fibers and the like in bright greenish-yellow tints of considerable clarity and of excellent fastness properties.

Example 2

About 0.1 part of the product prepared in Example 1 is stirred into about 10 parts of a urea formaldehyde varnish, (Uformite F–200E, Rohm and Haas). The mixture is heated on a hot plate until a clear solution is obtained. On cooling there is obtained a brilliant greenish yellow fluorescent color having good fastness to light and to migration.

The foregoing examples are illustrative of the invention only and are not intended to limit the scope of the invention. The terms and expressions employed are terms of description only and not of limitation. It is recognized that various modifications are within the scope of the invention.

I claim:
1. A 4-amino-N-aryl-1,8-naphthalic imide, suitable as a colorant, of the formula:

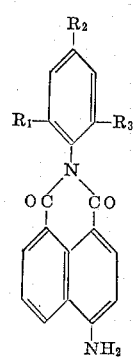

wherein $R_1$, $R_2$ and $R_3$ may be the same or different and represent lower alkyl groups of one to four carbon atoms inclusive.

2. The compound of the formula:

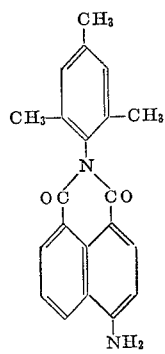

3. The compound of the formula

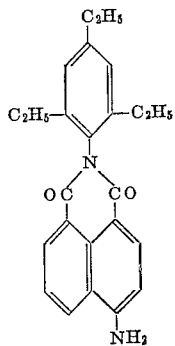

4. The compound of the formula

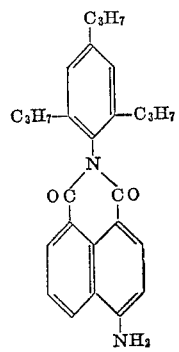

5. The compound of the formula

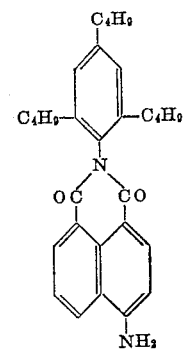

wherein $C_4H_9$ may be an isobutyl or n-butyl.

References Cited
UNITED STATES PATENTS

| | | | |
|---|---|---|---|
| 1,836,529 | 12/1931 | Eckert et al. | 260—281 |
| 3,096,333 | 7/1963 | Wilson et al. | 260—281 |

ALEX MAZEL, *Primary Examiner.*

D. DAUS, *Assistant Examiner.*